Patented Mar. 8, 1938

2,110,695

UNITED STATES PATENT OFFICE 2,110,695

PRODUCTION OF DIMERS OF POLYHYDRIC ALCOHOLS

George W. Batchelder, Woodbury, N. J., assignor to E. I. du Pont de Nemours & Company, Wilmington, Del., a corporation of Delaware No Drawing. Application October 10, 1936, Serial No. 105,085

10 Claims. (Cl. 260—151)

This invention relates to an improved method of treating polyhydric alcohols for the production of dimers of polyhydric alcohols and more particularly to a process that brings about the production of diglycerin from glycerin under conditions of high yield and purity.

The polymers of glycerin have been produced, according to the prior art, by heating glycerin at elevated temperatures, 210–280° C. for example, for various intervals of time, under which conditions water is split out and condensation-polymerization takes place. While simple heating of the glycerin is sufficient to bring about polymerization, the use of condensing agents has been proposed by a number of investigators. Some of the agents proposed for this purpose have comprised sulfuric acid, alkalis, sodium acetate, iodine, zinc chloride, and the like.

The use of condensing agents has in general promoted the reaction and shortened the time required but has had the tendency to cause the formation of higher polymers than has been desired, except under very carefully controlled conditions. The object in polymerizing glycerin has in general been the production of diglycerin, free from contamination with the higher polymers, and this material has had its principal application in the explosives industry. Diglycerin on nitration gives the compound known as tetranitrodiglycerin, though more accurately designated as diglycerin tetranitrate. When glycerin is polymerized by heating, a satisfactory product can be obtained having a diglycerin content of between 30 and 45%, which on nitration gives a product substantially equivalent to nitroglycerin in explosive properties but offering much greater resistance to freezing.

It has been found very difficult to obtain, by the methods of the prior art, a satisfactory quality of diglycerin in concentrations higher than 45%. Excessive formation of higher polymers, such as triglycerin, tetraglycerin, and the like, occurs on further heating and these higher polymers are unsuitable for nitration purposes. Diglycerin of relatively high purity can be obtained by careful fractionation of the glycerin-diglycerin-polyglycerin solutions, but the yields obtained are insufficient to make such a method commercially desirable. When substantially pure diglycerin is wanted for industrial operations, therefore, the prior art methods of production are unsatisfactory.

The object of my invention is an improved method for the production of the substantially pure dimer of an aliphatic polyhydric alcohol. A further object is a method in which diglycerin is obtained free from higher polymers and in higher yields than has been the case heretofore. A still further object is a method in which blends of diglycerin with higher polymers of predetermined composition are obtained. Additional objects will be disclosed as the invention is further described hereinafter.

I have found that the foregoing objects are accomplished by first heating the glycerin to a temperature at which water is split off and condensation-polymerization takes place, and then subjecting the reaction mixture to steam distillation under vacuum, which latter treatment not only distills the water and the glycerin from the reaction mixture, but also depolymerizes the higher glycerin polymers.

The first step of my improved process, namely the polymerization step, may be carried out in the presence of condensing agents if desired. It is more satisfactory, however, to carry out the polymerization in the absence of such agents, since they promote the formation of the higher polymers, and since they inhibit or retard the subsequent depolymerization of these undesirable polymers. The reaction mixture produced in the polymerization step contains higher polymers of glycerin than the dimer. However, the subsequent treatment of the reaction mixture with superheated steam results in the depolymerization of the higher polymers to diglycerin or glycerin. The water and the glycerin in the reaction mixture are distilled therefrom, by carrying out the depolymerization step under a vacuum.

The following example will serve to illustrate my process more exactly. It should be understood, however, that this is illustrative only and in no way limits my method of procedure to the details hereinafter set forth.

One thousand pounds of glycerin are polymerized by heating in a still under a vacuum of approximately 6 inches of mercury, at about the boiling point of the material at the existing pressure. The heating is continued for 7 hours, a reflux condenser preventing any loss of glycerin but permitting the evolved water to escape. At the end of the heating or polymerization period, the reaction mixture contains about 70% polymer, calculated as the dimer, although, of course, considerable amounts of the higher polymers are present. The reaction mixture is then steam distilled for 1½ hours with steam preferably at a temperature of about 200° C., under a vacuum of 28 to 29 inches of mercury, water and glycerin being collected in the distillate. The steam distillation is discontinued when the economical stopping point has been reached, as determined by testing the residue, or by previous experimental runs. In this manner a residue containing between 90 and 95% diglycerin, and 10 to 5% glycerin is obtained. The product is substantially free from the higher polymers, such as triglycerin and the like.

It will be apparent that my invention furnishes a method not available heretofore for obtaining substantially pure diglycerin in yields that make commercial operations practicable. Whereas previous methods have been satisfactory where solutions of 30 to 40% diglycerin in glycerin were desired, the present method makes it possible to obtain diglycerin-glycerin mixtures of more than 90% diglycerin content, and free from higher condensation products. In such form the diglycerin is available for use in industrial processes or for the preparation of its derivatives that may have application in organic industries.

In addition to the production of diglycerin, it may be desired to produce a predetermined mixture of definite polymers of glycerin for utilization for certain purposes. This can be brought about by operating in general in accordance with the example given but controlling the amount of steam introduced to the predetermined optimum quantity, so that only the desired amount of the higher polymers are depolymerized.

In the foregoing description of my invention, I have applied it to the production of diglycerin from glycerin. It will be apparent, however, that it is equally applicable to the production of polymers of many other aliphatic polyhydric alcohols. For example, I may apply this method to the production of the dimers of ethylene glycol, trimethylene glycol, tetramethylene glycol, pentamethylene glycol and similar polymethylene glycols; propylene glycol, the various butylene glycols and similar substituted glycols; and a large number of other aliphatic polyhydric alcohols.

The terms "polymerization", "condensation-polymerization", "polymer", etc., employed throughout the specification and appended claims, are used as defined by Carothers in Chemical Reviews 8, 355 et seq. (1931), to which reference is made for a complete discussion of the meaning thereof. Briefly, however, condensation, as here employed, refers to a reaction resulting in the formation of new bonds between atoms not already joined and proceeds with the elimination of elements or simple compounds. Polymerization is a chemical combination of a number of simple molecules to form a single molecule, a polymer being any compound formed by such a process and capable of being degraded by the reverse process. Condensation-polymerization is a type of polymerization in which the reaction proceeds with the elimination of simple elements or compounds.

It will be understood that many variations may be made from the details of procedure described in the foregoing, without departure from the spirit of the invention. I intend, therefore, to be limited only by the following patent claims.

I claim:

1. The process of producing the dimer of an aliphatic polyhydric alcohol which comprises heating said polyhydric alcohol to a temperature at which condensation-polymerization takes place and water is split off, and subsequently treating the reaction mixture, under reduced pressure, with steam.

2. The process of claim 1, in which the polyhydric alcohol is ethylene glycol.

3. The process of claim 1, in which the polyhydric alcohol is glycerin.

4. The process of dimerizing glycerin which comprises heating glycerin to a temperature at which condensation-polymerization takes place and water is split off, and subsequently treating the reaction mixture, under reduced pressure, with superheated steam.

5. The process of claim 4, in which a condensing agent is used to assist polymerization.

6. The process of producing a predetermined blend of glycerin polymers which comprises heating glycerin to a controlled elevated temperature sufficient to bring about condensation with splitting off of water, and subsequently treating the reaction mixture with a predetermined amount of superheated steam.

7. The process of producing substantially pure diglycerin which comprises heating glycerin to a temperature at which condensation-polymerization takes place, distilling the water and glycerin under reduced pressure, and simultaneously introducing superheated steam into the reaction mixture.

8. The process of claim 7, in which the distillation is carried out under a vacuum of at least 28 inches of mercury.

9. The process of dimerizing an aliphatic polyhydric alcohol which comprises heating said polyhydric alcohol to effect polymerization thereof, and subsequently subjecting the reaction mixture to superheated steam distillation under vacuum to depolymerize the higher polymers and to effect the removal of the water and a substantial proportion of the monomer from said dimer.

10. The process of forming substantially pure diglycerin, which comprises heating glycerin to effect the polymerization thereof, and subsequently subjecting the reaction mixture to superheated steam distillation under vacuum.

GEORGE W. BATCHELDER.